United States Patent

[11] 3,568,163

[72] Inventor Thomas E. Osborne
San Francisco, Calif.

[21] Appl. No. 765,422
[22] Filed Oct. 7, 1968
[45] Patented Mar. 2, 1971
[73] Assignee Hewlett-Packard Company
Palo Alto, Calif.

[54] INCREMENTAL DISPLAY CIRCUIT
5 Claims, 2 Drawing Figs.

[52] U.S. Cl. ........ 340/172.5
[51] Int. Cl. ........ G06f 3/14
[50] Field of Search ........ 340/172.5; 235/157

[56] References Cited

UNITED STATES PATENTS

| | | | |
|---|---|---|---|
| 3,248,703 | 4/1966 | Moore et al. | 340/172.5 |
| 3,324,458 | 6/1967 | MacArthur | 340/172.5 |
| 3,371,321 | 2/1968 | Adams | 340/172.5 |
| 3,400,371 | 9/1968 | Amdagl et al. | 340/172.5 |
| 3,418,638 | 12/1968 | Anderson et al. | 340/172.5 |

*Primary Examiner*—Gareth D. Shaw
*Attorney*—A. C. Smith

ABSTRACT: A display circuit for a calculating machine may be activated at selected intervals in a series of preselected program steps to provide a momentary output indication of an incremental calculation. Resumption of operation according to the preselected program steps may be inhibited manually to extend the duration of the output indication.

INVENTOR.

THOMAS E. OSBORNE

BY

A. C. Smith
attorney

PATENTED MAR 2 1971 3,568,163

SHEET 2 OF 2

INVENTOR

THOMAS E. OSBORNE

BY A. C. Smith

ATTORNEY

INCREMENTAL DISPLAY CIRCUIT

BACKGROUND OF THE INVENTION

Electronic calculating machines are commonly operated to perform a series of calculations in approaching a final answer as in problems involving infinite series or damped oscillations, or the like. It is frequently convenient to observe the results of the calculations at selected intervals of time or after selected number of steps in the calculation so that the trend in the calculation results may be analyzed or so that selected values may be plotted.

SUMMARY OF THE INVENTION

Accordingly, the present invention provides incremental display apparatus for a calculating machine which interrupts the calculation routine at selected intervals for displaying the calculation results during a predetermined period or during a period of variable duration selected through operation of a manual keyboard.

This is accomplished by introducing a PAUSE instruction in a series of program instructions that select the operating routines. This instruction produces a display for a preselected interval of the results of the last calculation. Thereafter, the calculations may proceed according to subsequently introduced instructions. Also, the programmed pause may be extended as desired by instructions introduced through the operation of a manual keyboard.

DESCRIPTION OF THE PREFERRED EMBODIMENT

Figure 1:
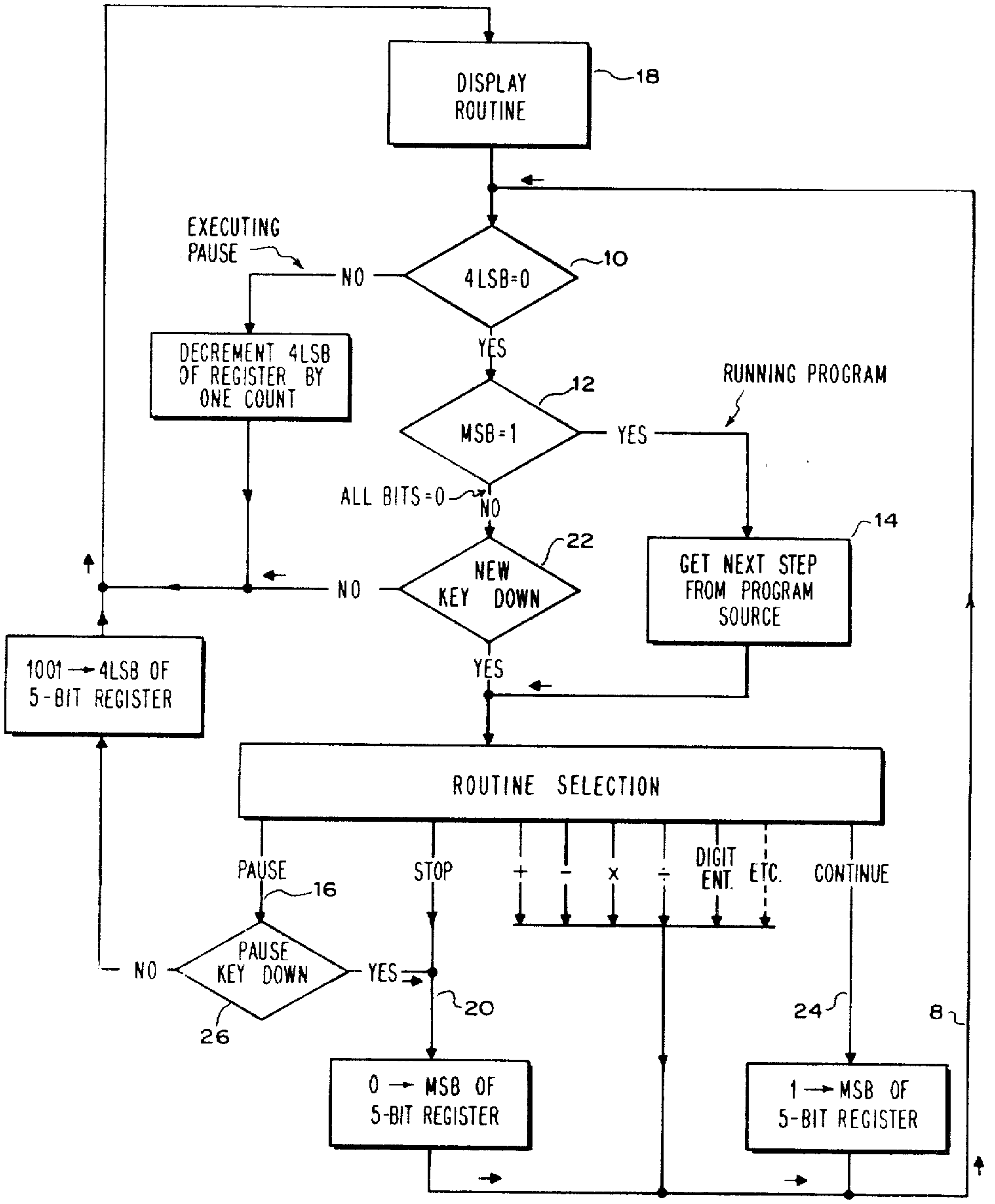
FIG. 1 is a signal flow chart showing the operation of the present invention.

Referring now to the flow chart of FIG. 1, there is shown an arrangement of selectable operating steps which enable the present invention to operate through a series of logical manipulations and then pause to display the incremental results. In general, the present invention operates repetitively in the DISPLAY routine when operating "at rest" in the absence of further instructions. This provides a continuous visual display that is representative of the logic states of the arithmetic processing unit at the end of a calculation. However, the present invention operates sequentially through successive steps and routines and thus normally cannot provide a display during execution of successive routines. Operation of the present invention through a succession of routines is as follows: At the end of an arithmetic routine, say, an ADD routine, a signal appears on line 8 which designates the end of the routine. This initiates a check of the condition of a director circuit which includes a five-bit register. If the four least significant bits of this register are all zero and the most significant bit is one, then the two qualifying steps 10, 12 initiate the automatic selection of the next program instruction from a program source 14. The new program instruction may select an arithmetic routine which is then executed by the arithmetic processing unit. At the end of this newly selected routine, an end-of-routine signal appears on line 8 which again initiates a check of the condition of the director circuit. Operation of the present invention normally continues through a program in this sequential manner without providing a visual display.

The PAUSE routine of the present invention enables the circuit to provide a visual display of calculation results at selected intervals during a series of programmed instructions. This enables an operator to observe the results of selected calculation steps so that these results may be plotted or so that the trend of the calculations may be analyzed, or the like. When the PAUSE routine is selected by the program source, the routine provides a signal on line 16 which, if the PAUSE key of the keyboard is not also depressed, presets the register of the director circuit to a selected binary number, say, 1001 and calls out the DISPLAY routine 18 which thus produces a visual display of calculation results for a few milliseconds. At the end of the DISPLAY routine, the first qualifying step 10 causes the register to be decremented by one (to binary 1000), followed by repetitive selection of the display routine. This operation continues repetitively through the preset number of cycles until the first qualifying step 10 is true and the second qualifying step 12 is also true. This causes a new program instruction to be called out and the circuit then continues sequentially to execute successive program instructions. This repetitive operation in the DISPLAY routine provides a continuous display of calculation results which lasts for about one-quarter of a second.

If the PAUSE key in the manual keyboard is depressed at the time a PAUSE routine is called out in the program, the qualifying step 26 is altered and the circuit operates in a manner similar to the selection of the STOP routine. The signal appearing on lines 20 following the qualifying step 26 sets the most significant bit of the register in the director circuit to zero. This produces a continuous display as a result of the repetitive selection of the DISPLAY routine through the qualifying steps 10, 12 and 22 and also precludes further automatic selection of program instructions by the qualifying step 12. This manual override of the PAUSE routine thus causes the circuit to operate repetitively in the DISPLAY routine (as long as no new key is depressed) to produce a continuous display that is representative of the calculation results in the arithmetic processing unit.

The circuit may be restored to automatic selection of program instruction by depressing the CONTINUE key on the keyboard. This changes the circuit operation at the third qualifying step 22 and permits the manual selection of the CONTINUE routine. The resulting signal on line 24 resets the most significant bit of the register in the director circuit to one and thereby alters the second qualifying step 12 to permit automatic selection of successive program instructions. The program instructions are then executed in succession without producing a visual display until another PAUSE routine is selected (which provides only a momentary display, as previously described) or until the program is concluded by selection of the STOP routine (which provides a continuous display, as described in connection with a signal appearing on line 20).

Figure 2:
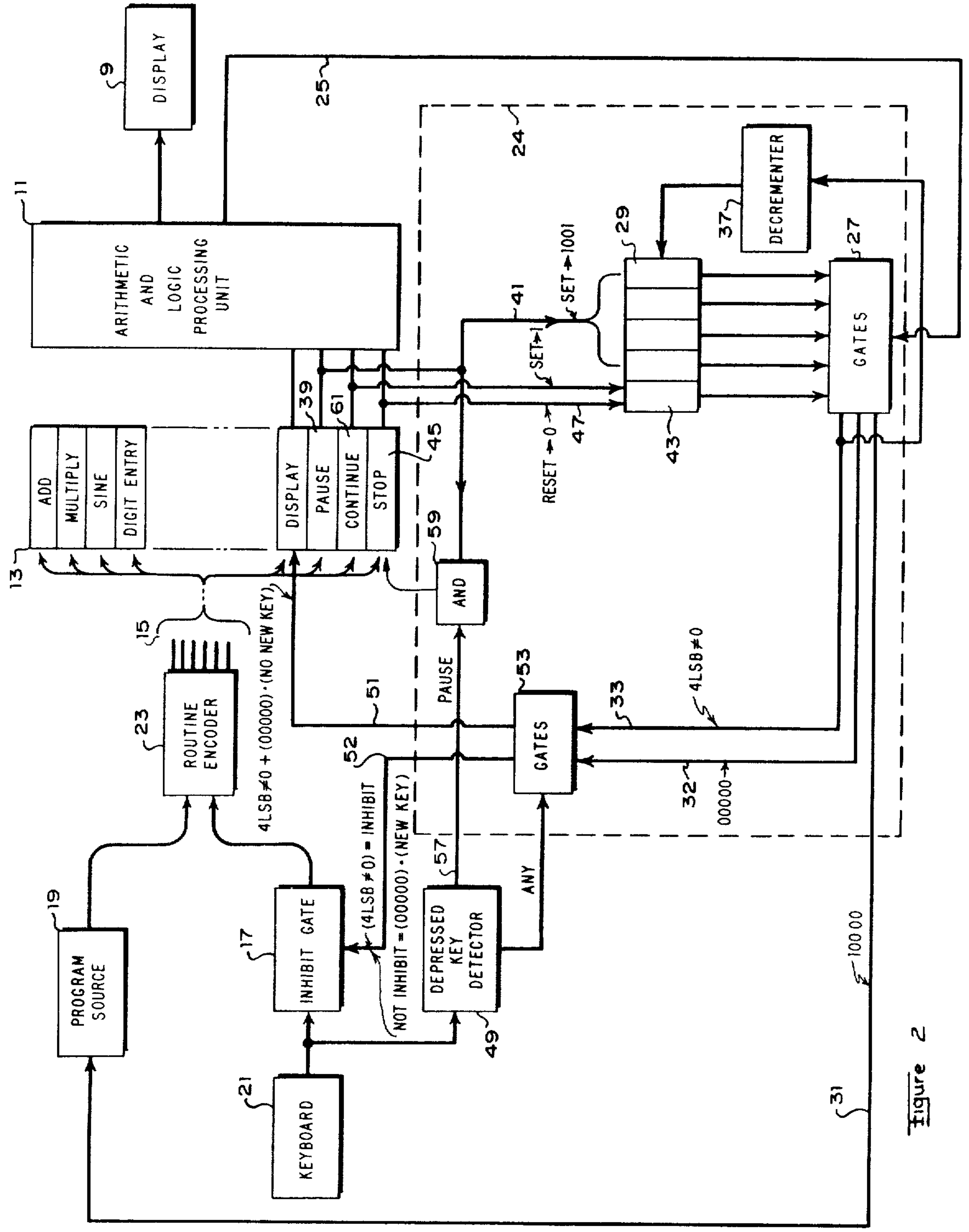
FIG. 2 is a block circuit diagram of one embodiment of the incremental display apparatus of the present invention.

Referring now to FIG. 2 of the drawing, there is shown a block schematic diagram of the circuit which operates in the PAUSE and other routines according to the present invention. The display device 9, which may be a conventional cathode-ray tube or printer, includes appropriate driving circuitry for forming alpha numeric characters and is connected to the arithmetic and logic processing unit 11 for displaying the results of a calculation performed by the processing unit 11. The display device 9 displays the results of a calculation whenever the DISPLAY routine stored in storage means 13 is called out by appropriate command. Each routine stored in the storage means 13 is typically a set of steps of logic directions required to instruct the processing unit 11 to perform certain arithmetic functions such as multiplication, division, digit entry, square root, trigonometric conversions, or the like. These routines are generally codes of binary bits which are stored in a read-only memory or other similar storage device that can store fixed sets of logic directions for random selection or call out in response to six-bit binary codes supplied to the storage means 13 along the six lines 15 from the routine encoder 23. Thus, a specific routine, say the multiplication routine, may be called out in a conventional manner as a particular succession of logic directions for processing unit 11 to perform in sequence merely by supplying a specific binary code to the storage means 13 through encoder 23 from either the automatic program source 19 or the manual keyboard 21.

The routines that can be called out from the routine storage means 13 (say, 64 different routines for six-bit or $2^6$ coded inputs from encoder 23) thus direct the processing unit 11 to perform selected logic operations in conventional manner on input numbers (usually supplied in binary-coded-decimal form using the DIGIT ENTRY routine of storage means 13) for producing calculation results in accordance with the desired arithmetic functions. Each routine stored in storage means 13 (with few exceptions not pertinent here) causes the processing unit 11 to produce an output on line 25 at the conclusion of the one or more logic steps that comprise the routine. This end-of-routine signal thus activates the present circuit to perform a successive routine at the conclusion of a previous routine. In addition to arithmetic routines, the storage means 13 also stores several functional routines such as DISPLAY, PAUSE, CONTINUE and STOP routines, and the operation of the present invention will now be described with reference to these routines.

GENERAL OPERATION

The circuit of the illustrated embodiment may function to produce an output indication on display device 9 which is representative of the logic states of processing unit 11 only when one routine called out from storage means 13 is concluded and the DISPLAY routine is called out as the next step. The DISPLAY routine may be called out either as a preselected program step or as a result of the present circuit operating "at rest" while waiting for the next instruction. This output indication in practice is produced on a cathode-ray display tube as one or more lines of numerical information only once each time the DISPLAY routine is called out. Since this single display of a line or lines of information may occur in the short interval of the sweep of an electron beam, typically a few milliseconds, the DISPLAY routine must be called out successively to produce a display of sufficiently long duration that an operator can perceive the line or lines of information as a continuous display. After each DISPLAY (or other) routine is performed, the end-of-routine signal on line 25 activates the director circuit 24 which comprises gates 27, 53 and 59 and register 29 and which determines whether the DISPLAY or other routine must be called out next. The register 29 is five bits in length, the four least significant bits of which are interconnected to count down only to zero from any preset binary number. Each bit of the register 29 is sensed by the gates 27 when activated by the end-of-routine signal on line 25. Only the unique condition of the register 29 attaining the states 1,0,0,0,0 (left to right) as sensed by gates 27 produces an output on line 31 for activating the source 19 of programs to select the next routine to be called out from register 13. Also, only the unique condition of all zeros in register 29 produces an output on line 32. All other conditions of register 29 produce an output on line 33 and on line 51 which results in the DISPLAY routine being called out directly from storage means 13.

If the four least significant bits in register 29 are not all zero, the signal on line 33 activates the decrementer 37 to apply a pulse to the input of register 29 for decreasing the count in the four least significant bits (LSB) by one. At the same time, the signal which appears on line 33 and which is applied to gates 53 causes the DISPLAY routine to be called out again. This process continues until the register 29 is decremented once per recurrence of the DISPLAY routine to the condition of the four least significant bits all being equal to zero. At that time, the four least significant bits of the register will not be decremented below zero and an output will appear either on line 31 or on line 32, depending upon whether the most significant bit is one or zero. If this bit is zero (as when the circuit is being operated manually via the keyboard 21), and no new instruction is introduced, the DISPLAY routine will again be called out. In this way, the DISPLAY routine will be continuously recycled to provide a numerical display of the logic states of the logic circuit when no further instructions are provided and the circuit is "at rest" following completion of previous routine.

PAUSE FUNCTION OPERATION

Operation of the circuit through a series of routines may be automatically controlled by the director circuit 24 and program source 19. Each time a signal appears on line 31 at the end of a previous routine (i.e., when the bits of register 29 are 1,0,0,0,0 left to right), a successive, preselected program step is supplied by the source 19. This calls out from the storage means 13 a successive routine which normally controls the manipulation of the logic states in processing unit 11 to perform some selected arithmetic, trigonometric or other operation on numbers stored in or applied to the processing unit 11. However, the successive routine called out from the storage means 13 by the next program step may be the PAUSE routine at station 39. This routine produces an output on line 41 which sets the four least significant bits of register 29 to some present binary number such as 1,0,0,1 (i.e. 9 in the decimal system), and the signal that appears on line 33 again causes the DISPLAY routine to be called out from storage means 13.

The circuit continues to operate in this manner (i.e., repetitively calling out the DISPLAY routine) until the four least significant bits of register 29 have been decremented (after nine repetitions of the DISPLAY routine) to all zeros. This repetitious use of the DISPLAY routine provides a numerical display on the display device 9 which is perceived by an observer as a continuous display lasting about one-quarter of a second.

At the end of this PAUSE routine, the circuit may then operate in the next step in one of two modes determined by the most significant bit 43 of register 29. If this bit is one, an output appears on line 31 which activates the program source 19 to advance to the next program step which, in turn, calls out the next preselected routine. Thus, if the circuit was previously operating automatically to select programmed routines prior to selection of the PAUSE routine, the most significant bit remains one. This bit was initially set to one, for example, merely by calling out the CONTINUE routine from the keyboard to start the circuit operating through the programmed, preselected routines. Therefore, after nine repetitions of the DISPLAY routine that result from a programmed selection of the PAUSE routine, the bits of register 29 are returned to 1,0,0,0,0 and this produces an output on line 31 that steps the program source 19 to the next preselected routine. Thereafter, normal arithmetic, trigometric or other manipulations of the logic states in processing unit 11 may continue until the end of the program or until another PAUSE routine is selected. The end of the program may be designated by the call out of the STOP routine. When this routine is called out from station 45, a signal is produced on line 47 which resets the most significant bit 43 to zero. At the end of this routine, the gates 27 check the bits in the register 29 and produce an output on line 33. As previously described, this causes the DISPLAY routine to be called out repetitively so that a continuous numerical display on the display device 9 may be perceived by an observer as long as the circuit continues to operate "at rest" without further instructions.

Referring again to the end of the PAUSE routine when the four least significant bits of register 29 are decremented to zero, if the most significant bit is zero (as when the circuit is not operating automatically to select programmed routines but rather is operated manually using the keyboard 21 to select routines) then an output appears on line 33 which causes the DISPLAY routine to be called out repetitively, as previously described, as long as the circuit continues to operate "at rest" without further instructions. When the circuit is operated by the keyboard 21 to select one routine after another, it is apparent that the DISPLAY routine will be called out repetitively at the conclusion of each previously selected routine. When a new routine is manually called out on the keyboard 21, the depressed key can actuate the routine encoder 23 that is connected to the keyboard 21 through inhibit gate 17 for producing the coded routine call-out signal only if this inhibit gate is enabled. An enabling signal condition is provided by gates 53 along line 52 only in response to the condition that all of the bits of register 29 are zero and a new key on keyboard 21 has been depressed. The depressed key detector 49 supplies a signal to gates 53 in response to actuation of any new key. A "new key" is the actuation of a key following the release of a previous key. Thus, with one exception discussed later, the keyboard 21 is inhibited from calling out a new routine during all other operating conditions of the present circuit. This means that a new routine may not be called out until a previously selected routine is concluded. Even if a newly selected key remains depressed following completion of the routine called out thereby, the end-of-routine signal on line 25 causes the gates 27 to check the bits of register 29 and produce the signal on line 33 that causes the DISPLAY routine to be called out. A numerical display of the logic states in processing unit 11 may thus be provided on display device 9 at the conclusion of each operation called out by the keyboard 21. Thus, if a selected number is to be introduced into the processing unit 11 for logical manipulation therein according to a selected routine, depressing a selected number key on keyboard 21 selects the DIGIT ENTRY routine in storage means 13 and also actuates the detector 49 which causes gates 53 to inhibit further keyboard entries until the signal on line 25 at the end of such routine causes gates 27 to produce the signal on line 33 that calls out the DISPLAY routine and also sets one condition for enabling gate 17 to pass a new routine-selecting signal. This prevents the circuit from repeating a DISPLAY routine until entry of the selected number into the processing unit 11 has been completed. After completion of the entry, the end-of-routine signal on line 25 again activates gates 27 to produce a signal on line 33 which again causes the DISPLAY routine to be called out repetitively until a new instruction is supplied, as previously described.

The exception to the keyboard 21 being inhibited from calling out a new routine occurs when the PAUSE key in the keyboard 21 is used to override the automatic, programmed operation of the present circuit in the PAUSE routine. As was previously described, the present circuit will effectively pause in its manipulation of the processing unit 11 to display a selected number of times the numerical representations of the logic states in the processing unit 11 in response to programmed selection of the PAUSE routine and then continue automatically through subsequent programmed routines. However, the PAUSE key on the keyboard may be depressed to override the automatic return to programmed operation. This causes the depressed key detector 49 to produce an output on line 57. This output must be present before the PAUSE routine is called out as one of the preselected program steps (i.e., the PAUSE key must be depressed at the time the program advances to the step of a PAUSE routine). Thus, when the PAUSE routine is called out, the signal on line 41, combined in AND gate 59 with the signal already present on line 57, calls out the STOP routine directly. This routine, as previously described, resets the most significant bit of register 29 (previously in the one state for programmed operation) to zero. At the same time, the signal on line 41 sets the four least significant bits of register 29 to 1,0,0,1 (or other suitable preset number). At the end of these operations in the PAUSE routine, the end-of-routine signal on line 25 activates gates 27 to check the bits of register 29 and thus produce an output on line 33. This causes the DISPLAY routine to be called out repetitively until a new instruction is supplied, as previously described. Each of the first nine repetitions of the DISPLAY routine includes a decrementing by one of the four least significant bits of register 29 but thereafter, the DISPLAY routine continues to be called out repetitively in the normal manner without the decrementing of the bits of register 29 below zero. Thus, the PAUSE routine which was originally called out as a program step was effectively converted to a STOP routine, the operation of which was previously described, by depression of the PAUSE key in keyboard 21. Automatic, programmed operation may again be restored only by depressing the CONTINUE key on keyboard 21. This enables inhibit gate 17 and the encoder 23 thus supplies a six-bit coded signal to the storage means 13 to call out the CONTINUE routine in station 61 in response to depression of the corresponding key in keyboard 21. This routine sets the most significant bit of register 29 to one and, at the end of the routine, when gates 27 check the bits of register 29, an output appears on line 31 which then steps the program source 19 to the next program instruction.

Therefore the incremental display circuit of the present invention provides a continuous display of logic states at the conclusion of a previous routine when no further instructions are supplied. Also, the present circuit may provide a momentary display at preselected intervals in a programmed series of routines. This momentary display may be manually extended in duration by preventing the circuit from automatically returning to operation. Thereafter, operation of the circuit according to a preselected program may only be restored manually. In this manner, the progression through programmed calculations may be carefully analyzed at preselected pause intervals.

I claim:

1. A data signal circuit comprising:
processing means including logic elements having logic states and performing selected logical manipulation of data signals;
circuit means coupled to said processing means for sequentially controlling the logical manipulations performed by said processing means in accordance with selectable ones of a plurality of logic routines including a PAUSE routine;
a source of instructions coupled to said circuit means and capable of selecting routines including a PAUSE routine from said circuit means in a predetermined sequence;
display means coupled to said processing means for providing an output indication that is representative of the logic states of said processing means in response to selection of said PAUSE routine by the source of instructions; and
timing means coupling the processing means and the source of instructions and responsive to selection of the PAUSE routine for activating said source after a predetermined period following selection of the PAUSE routine to continue selecting routines in said predetermined sequence, whereby the display means provides the output indication during the pause of said predetermined period in the sequential selection of routines by said source of instructions.

2. A data signal circuit as in claim 1 comprising:
manually manipulatable keyboard means coupled to said processing means and including a first key for selecting the PAUSE routine; and
a gate circuit coupled to said circuit means and responsive to selection of the PAUSE routine from said circuit means by the source of instruction and to actuation of said first key for interrupting the subsequent selection of successive routines in said predetermined sequence.

3. A data signal circuit as in claim 2 wherein the display means coupled to said processing means provides a persistent output indication that is representative of said logic states in response to said interruption of subsequent selection of successive routines in said predetermined sequence.

4. A data signal circuit as in claim 2 wherein:
said keyboard includes a second key for overriding interruption of the routine selection by the source of instructions;
a bit register operable in either one of two operating states having an input connected to respond to the output of said gate circuit for operating in response thereto in one operating state and having an input connected to respond to actuation of said second key for operation in the other operating state; and
means coupled to said bit register for interrupting routine selection by the source of instructions and for actuating the display means to provide said persistent output indication in response to operation of said bit register in said one operating state, and for enabling subsequent routine selection by said source of instructions and for interrupting said persistent output indication by said display means in response to operation of the bit register in said other operating state.

5. A data signal circuit as in claim 1 wherein:

said timing means includes a count register having a plurality of bit or digit places and includes gating means having inputs responsive to the bits or digits in said count register and having an output coupled to activate said source of instructions;

said count register of said timing means being conditioned to count recurringly for a preselected count in response to selection of the PAUSE routine; and said gating means producing an output for activating said source of instructions to continue selecting routines in said predetermined sequence in response to completion of said preselected count.